Figure 1:
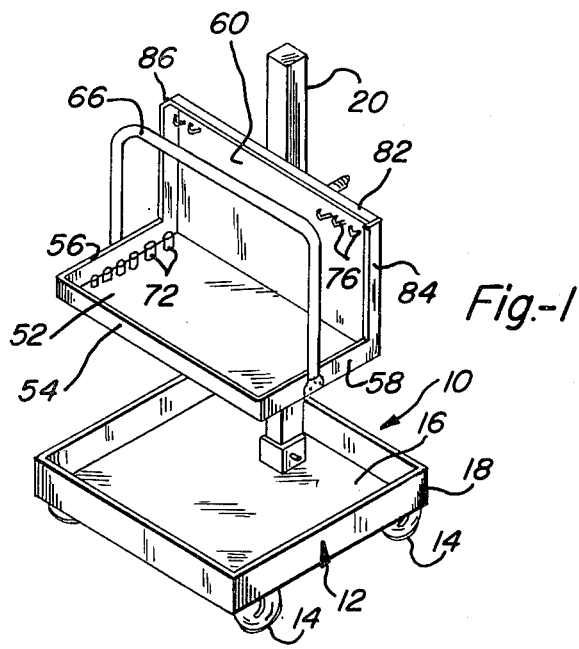

United States Patent [19]
Hines

[11] 4,119,044
[45] Oct. 10, 1978

[54] TOOL CADDY

[75] Inventor: Ralph E. Hines, Walden, Colo.

[73] Assignee: Merlin J. Peterson, Walden, Colo.; a part interest

[21] Appl. No.: 760,073

[22] Filed: Jan. 17, 1977

[51] Int. Cl.$^2$ ............................................. A47B 31/00
[52] U.S. Cl. ........................................ 108/27; 108/28; 108/146; 248/125; 248/145.6; 211/60 T; 280/47.34; 312/DIG. 33
[58] Field of Search ............... 108/27, 28, 47, 106, 108/146; 248/125, 132, 145.6, 409; 211/60 T, 126, 133, 208; 312/DIG. 33; 280/79.2, 79.3, 47.34, 47.35; 224/42.46 R, 42.45 R, 42.44

[56] References Cited
U.S. PATENT DOCUMENTS

| | | | |
|---|---|---|---|
| 2,988,175 | 6/1961 | West | 280/47.35 X |
| 3,028,975 | 4/1962 | Bullock | 211/126 |
| 3,203,558 | 8/1965 | Ullman | 211/126 |
| 3,339,938 | 9/1967 | Edmisson | 248/124 X |
| 3,726,393 | 4/1973 | Thompson | 211/60 T X |
| 3,734,526 | 5/1973 | Propst et al. | 248/224.3 X |
| 3,881,773 | 5/1975 | Rodaway | 297/DIG. 4 X |
| 4,026,415 | 5/1977 | Sarley | 211/4 |

FOREIGN PATENT DOCUMENTS 1,265,508   7/1960   France ............................ 280/47.34

*Primary Examiner*—Roy D. Frazier
*Assistant Examiner*—William E. Lyddane
*Attorney, Agent, or Firm*—Hugh H. Drake

[57] ABSTRACT

A tool caddy has a wheeled horizontal platform from which a post projects rigidly upward near one margin of the platform. A support assembly is mounted on the post for movement in a vertical direction, and the assembly includes an upwardly-facing ledge. The combination includes a means for latching the support assembly at selectively different heights above the platform. A horizontal tray is positionable above the platform. A hanger rigidly affixed at one side of the tray is engageable over the ledge so as to support the tray removably above the platform. A handle is secured to the tray and is positioned thereabove in an orientation enabling disengagement of the hanger from the ledge upon an upward pull to the handle.

6 Claims, 9 Drawing Figures

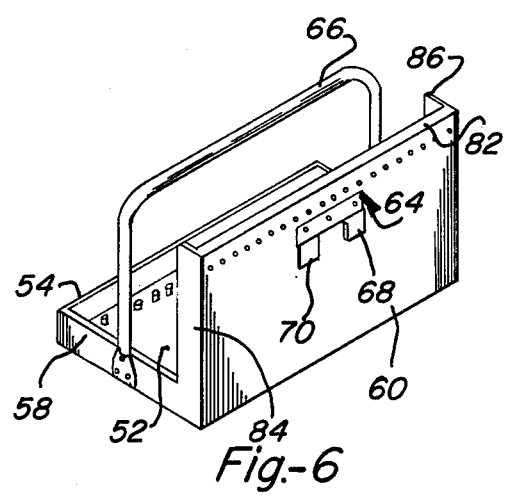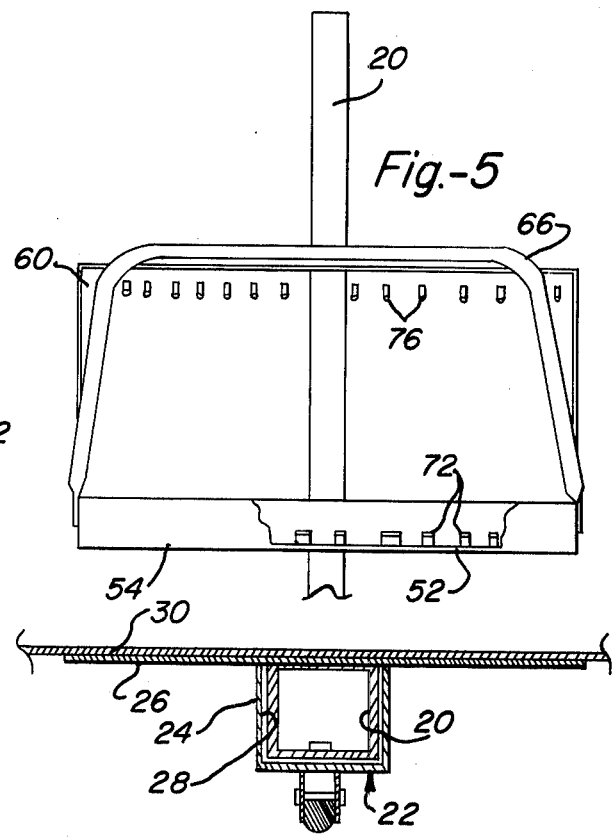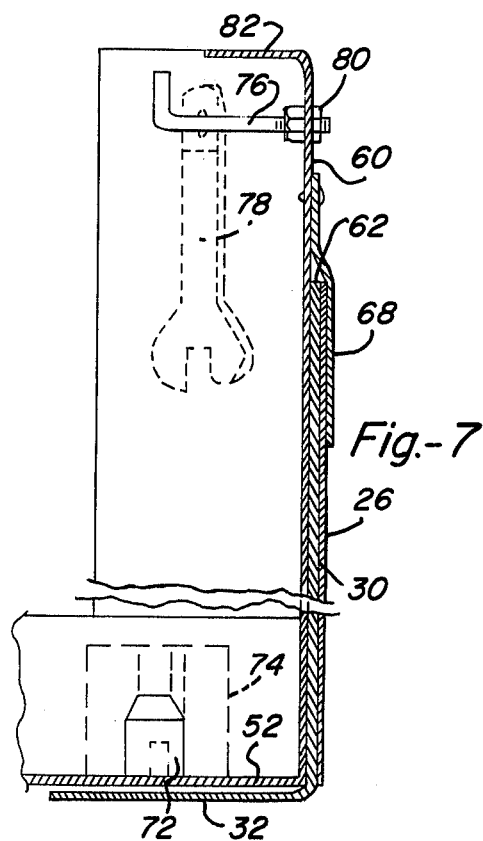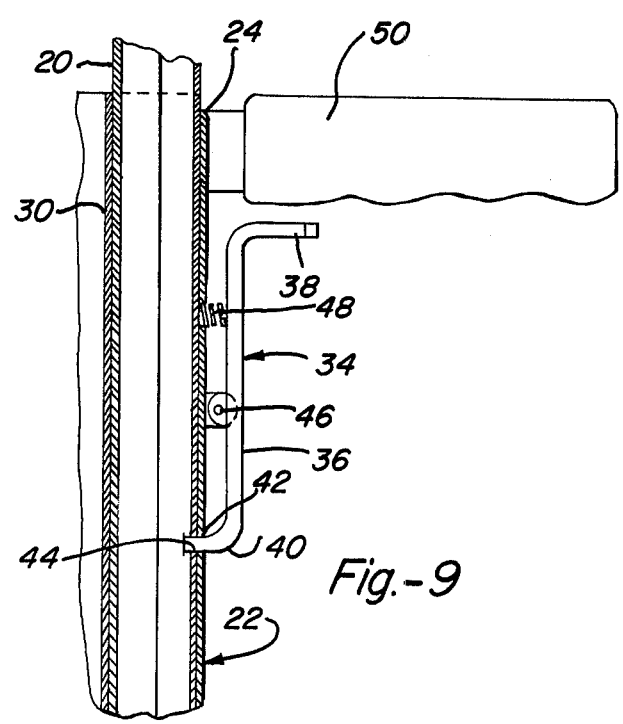

TOOL CADDY

The present invention pertains to a tool caddy. More particularly, it relates to a wheeled carrier of tools and the like that features a readily removable tool-carrying tray.

Mechanics and the like working on machinery, automobiles or other equipment have a need for the ready accessibility of a variety of different tools. At the very least, the typical mechanic may use a tool box that features a closable compartment and often includes a top-mounted tray in which can be placed the most frequently-used tools needed at the worksite. However, it may be the case that such a tool box becomes too large and/or heavy when loaded with all of the tools sometimes necessary in the servicing, maintenance and repair of even comparably compact equipment such as automobiles.

In view of such limitations upon a basic tool box, the prior art has come forth with wheeled tool caddies which afford trays in which tools may be carried and provide mobility as when moving from one job site to another. An example is the apparatus shown in U.S. Pat. No. 3,339,938-Edmisson. Edmisson features an upper tray for tools that is telescopically mounted above a lower tray on the underside of which wheels are affixed. Thus, his unit may be readily moved to the job site and his upper tray may be disposed at a selectively adjustable height so as best to accommodate access of the different tools carried in that tray to the job.

Of course, all kinds of wheeled dollies have been used for various approaches to supplying some kind of materials to a site where they are used. For example, U.S. Pat. No. 3,734,526-Propst et al. discloses a wheeled cart which has a plurality of hanger bars on which material containers may be suspended. Unlike the apparatus of Edmisson, however, there is no provision for height adjustment so as to enable proper adaptation to a particular working level. While Edmisson does disclose a structure which enables such adjustment, his apparatus is devoid of the feature of the old fashioned tool box whereby a tool-carrying tray may be detached and moved directly to the immediate site of the work effort.

What is needed, therefore, is a storage mechanism for tools that is readily movable to the general area of a work project and yet which includes a tray or the like for carrying the most frequently used tools and which may be detached and placed right at the actual work area. At the same time, such a device should include self-supporting heighth adjustability of that tool tray when it is in place on the unit.

It is, therefore, a principal object of the present invention to provide a new and improved tool caddy which meets all such requirements.

Another object of the present invention is to provide a new and improved caddy which affords greater flexibility in manner of usage while yet being capable of being manufactured in a simple and most direct manner.

In accordance with one embodiment of the present invention, a tool caddy includes a horizontal platform having wheeled support. A post projects rigidly upward from near one margin of the platform. Mounted on the post is a support assembly movable in a vertical direction and including an upwardly-facing ledge. The support assembly is latchable at selected different heights. Positionable above the platform is a horizontal tray. A hanger affixed at one side of the tray is engageable over the ledge for support of the tray removably above the platform. Secured to the tray is a handle positioned in an orientation enabling disengagement of the hanger from the ledge upon an upward pull.

Figure 2:
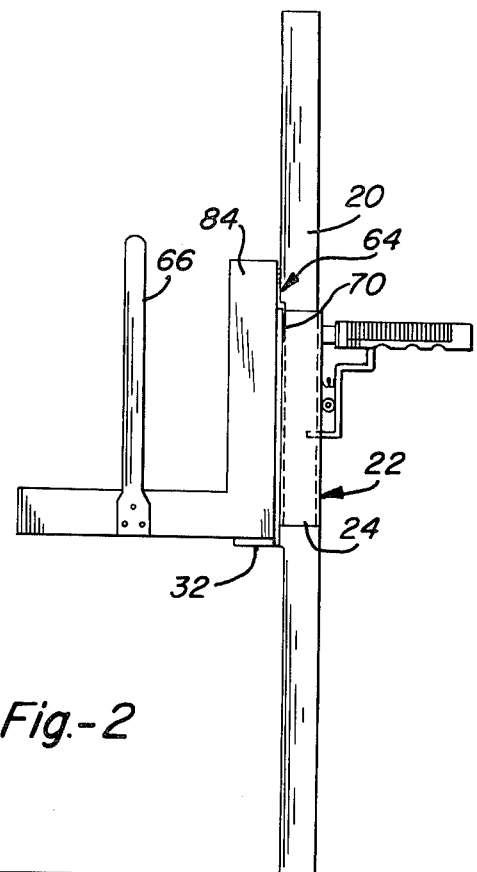
Figure 3:
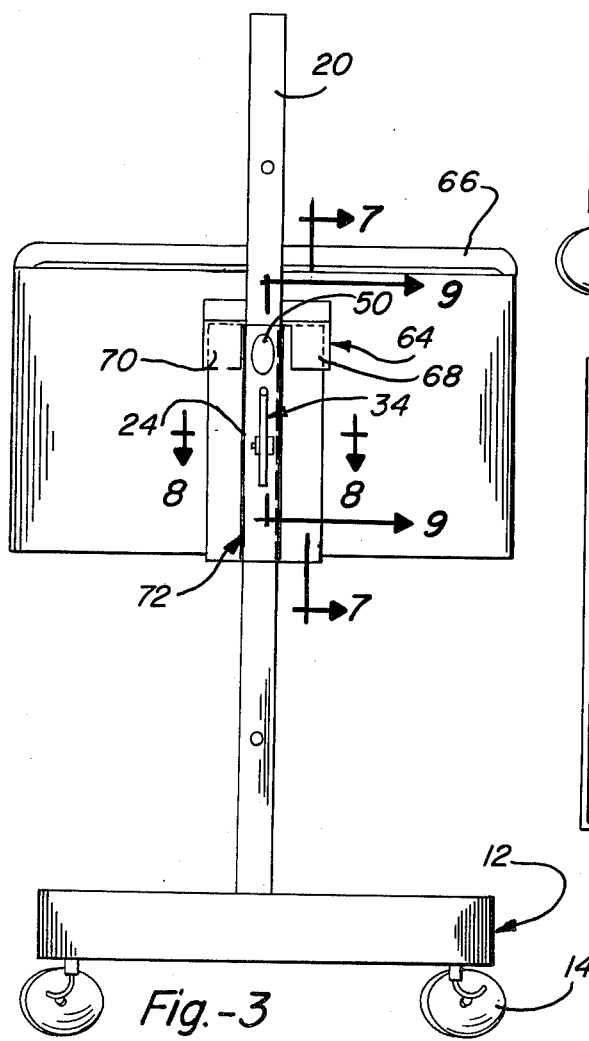
Figure 4:
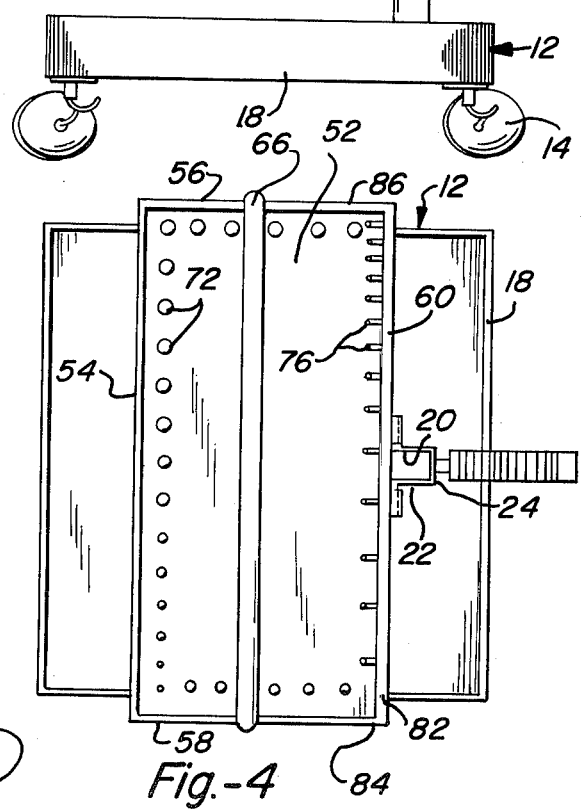

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is a perspective view of a tool caddy;
FIG. 2 is a side-elevational view thereof;
FIG. 3 is a rear-elevational view thereof;
FIG. 4 is a top plan view thereof;
FIG. 5 is a fragmentary and partially broken away front-elevational view thereof;
FIG. 6 is a perspective view of one of the components shown in FIG. 1;
FIG. 7 is a fragmentary cross-sectional view taken along the line 7—7 in FIG. 3;
FIG. 8 is a fragmentary cross-sectional view taken along the line 8—8 in FIG. 3; and
FIG. 9 is a fragmentary cross-sectional view taken along the line 9—9 in FIG. 3.

As illustrated for a particular embodiment, a tool caddy 10 includes a platform 12 supported by wheels 14 for movement over a surface. Platform 12 has a bottom plate 16 and upstanding walls 18 around its margin. Although wheels 14 may take any desired form, it has been found in normal usage involving a shop with a concrete floor that the best form of wheels 14 is that of the kind of castors normally and conventionally used on the underside of sliders designed to support a mechanic for movement while gliding over a surface and within a confined space such as beneath an automobile.

Projecting rigidly upward from near the rear margin of platform 16 is a post 20. A support assembly 22 is mounted on post 20 for movement in a vertical direction toward and away from platform 12. Assembly 22 includes a tube 24 ensleeved upon post 20. With particular reference to FIGS. 7 and 8, it will be observed that tube 24 is in this case completed by a combination of a first panel 26 formed intermediate its width to define a U-shaped channel 28 which fits snugly but slidably around three sides of post 20. Panel 26 is secured, as by spot welding, to a plate 30 disposed across the otherwise open side of channel 28 so as to complete the formation of channel 28. The lower marginal portion of plate 30 is turned laterally away from tube 24 so as to define a lip 32.

Included on tube 24 is a latch 34 to enable selective detenting of support assembly 22 at chosen different heights above platform 12. Latch 34 includes a somewhat S-shaped lever 36 that has an upper leg 38 which projects rearwardly and a lower leg 40 which projects forwardly through an opening 42 in the rear wall of tube 24. Spaced apart vertically in the rear wall of post 20 are a succession of openings 44 any one of which may be aligned with opening 42 and lower leg 40 as to achieve latching in correspondence with the one of openings 44 selected. Latch 34 is mounted from tube 24 by a pivot 46 and loaded by a compression spring 48 so as to be urged into a position with lower leg 40 projecting through opening 42 and one of openings 44 to achieve the desired latching relationship. Projecting rearwardly from near the upper end of tube 24 is a handgrip 50. Handgrip 50 is spaced above leg 38, which serves as a latch operator, by a distance that facilitates actuation of the latch upon the grasping of the handgrip by an adult human hand of average size.

Completing the basic components of the overall combination is a horizontal tray 52 positionable above platform 12. Upstanding from the front and side margins of tray 52 are respective comparatively short walls 54, 56 and 58. Projecting upwardly at a much greater height from the rear margin of tray 52 is a back wall 60.

The upper margins of channel 26 and plate 30 together define an upwardly facing ledge 62. Rigidly affixed at one side of tray 52, and specifically mounted on the external surface of back wall 60, is a hanger 64. Hanger 64 is engageable over ledge 62 to support tray 52 removably above platform 12. Secured with respect to tray 52 is a handle 66 positioned above tray 52 in an orientation enabling disengagement of hanger 64 from ledge 62 upon an upward pull to the handle.

It will be observed that ledge 62 projects horizontally away from opposing sides of post 20. Correspondingly, hanger 64 includes a pair of downwardly depending tongues 68 and 70 spaced laterally outward from wall 60 of tray 52 and individually disposed transversely apart to engage over ledge 62 on respectively opposite sides of post 20. Handle 66 is oriented in the direction parallel to ledge 62, thereby providing proper balance for carrying tray 52 and at the same time enabling its ready engagement or disengagement from support assembly 22 simply by slipping tongues 68 and 70 into or out of position engaged over ledge 62. When tongues 68 and 70 are engaged over ledge 62, lip 32, formed at the bottom of plate 30, affords additional support to the underside of tray 52.

To facilitate storage of tools such as wrench sockets, a plurality of spindles 72, individually of respective different diameters, project upwardly from tray 52 and are distributed in an array around its perimeter so as to support a respective plurality of tools receivable thereon. With reference to FIG. 7, a wrench socket 74 is illustrated in phantom as an example. Back wall 60 serves to carry a plurality of tool suspensions or hooks 76 that project from wall 60 over tray 52 in a manner to hold tools in place as illustrated in FIG. 7 by way of a phantom showing of a wrench 78. In this particular case, each hook 76 is threaded into a nut 80 spot welded in place within an opening formed in back wall 60.

An upper marginal portion 82 is turned forwardly in order to strengthen back wall 60 and thereby lend rigidity to the entire tray assembly. Similarly, the vertical side marginal portions of back wall 60 also are turned forwardly so as to define flanges 84 and 86. Of course, flanges 84 and 86 add further rigidity to the tray assembly. In addition, flanges 84 and 86 project forwardly beyond portion 82 so as to define an exposed upper rim upon which a suitable tool may be clipped for storage.

In at least one form of normal and typical usage, the mechanic or technician utilizes lower platform 12 for carrying heavy or bulky tools such as power drills, saws and mallets. Upper tray 52 is utilized to accept an orderly arrangement of sockets disposed upon spindles 72 and wrenches suspended from hooks 76. Screwdrivers, small hammers, pliers, and miscellaneous other tools are then placed on the floor of tray 52. If desired, hooks 76 may at least in part be replaced with eyes so as to support an orderly arrangement of shanked tools such as screwdrivers. However constituted in detail, the overall arrangement preferably is such as to permit an orderly storage of the different tools. This is important to the user in that, upon completion of a job, he can rather quickly scan the contents to determine if any particular tool is missing. Of course, that assists the user in avoiding the ever-present problem of overlooking a tool left in some concealed place in or around the equipment upon which he has been working. Such provision for orderly storage also assists the user in quickly locating that tool which he must have at any given time.

For most jobs, the entire tool caddy is rolled to a location convenient to the job area. For a number of jobs, all that may be required is the nearby presence of the entire tool caddy, with the mechanic selecting and removing tools from either platform 12 or tray 52 as needed. On the other hand, it is frequently required that the user enter into a tight space situation for performing his work while yet requiring a variety of at least the smaller tools. When that situation appears, the user may readily dislodge upper tray 52 and carry it and its included small tools directly into a confined space or at least be able to position tray 52 as closely as possible to the space in which he is working. One everyday example is in the servicing of automobiles. The overall arrangement of the tool caddy is such that all tools normally required may be rolled into a position adjacent to the automobile. When the mechanic is working underneath the vehicle or deep into the engine compartment, for example, the present tool caddy provides him with the option of disengaging and moving upper tray 52 directly to the immediate working site. At least for automotive-service applications, wall 60, therefore, is preferably limited in height to that which will fit beneath most automobiles.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:
1. A tool caddy comprising:
   a horizontal platform having wheeled support for movement over a surface;
   a single post projecting rigidly upward centrally from near one margin of said platform;
   a support assembly mounted on said post for movement in a vertical direction toward and away from said platform and including an upwardly-facing ledge, said ledge projecting horizontally away from opposing sides of said post;
   means for latching said support assembly at selectively different heights above said platform;
   a horizontal tray positionable above said platform;
   a hanger affixed at one side of said tray and engagable over said ledge to support said tray removably above said platform, said hanger including a pair of downwardly depending tongues spaced laterally outward from said tray and individually disposed transversely apart to engage over said ledge on respective opposing sides of said post;
   and a handle secured to said tray and positioned thereabove in an orientation enabling disengagement of said hanger from said ledge upon an upward pull to the handle.
2. A caddy as defined in claim 1 in which said handle is oriented in a direction parallel to said ledge.

3. A caddy as defined in claim 1 which said tray includes a wall projecting upwardly from one margin of said tray and in which said hanger is affixed directly to the outward vertical surface of said wall.

4. A caddy as defined in claim 5 in which flanges project from said wall along each adjacent margin of said tray in a manner defining an exposed upper rim.

5. A caddy as defined in claim 1 in which said latching means includes a latch operator projecting outwardly away from said post, in which said support assembly includes a handgrip projecting outwardly away from said post, and in which said operator and handgrip are spaced apart by a distance facilitating actuation of said operator upon grasping of said handgrip by the average human hand.

6. A caddy as defined in claim 1 in which said support assembly includes a lip underlying and adjacent to said tray when said hanger is engaged upon said ledge.

* * * * *